United States Patent
Nielsen

(10) Patent No.: US 12,071,228 B1
(45) Date of Patent: Aug. 27, 2024

(54) DRONE WITH PROPELLER GUARD CONFIGURED AS AN AIRFOIL

(71) Applicant: Snap Inc., Santa Monica, CA (US)

(72) Inventor: Simon Saito Haagen Nielsen, Beverly Hills, CA (US)

(73) Assignee: Snap Inc., Santa Monica, CA (US)

(*) Notice: Subject to any disclaimer, the term of this patent is extended or adjusted under 35 U.S.C. 154(b) by 742 days.

(21) Appl. No.: 16/814,117

(22) Filed: Mar. 10, 2020

Related U.S. Application Data

(60) Provisional application No. 62/825,463, filed on Mar. 28, 2019.

(51) Int. Cl.
| | |
|---|---|
| *B64C 27/20* | (2023.01) |
| *B64C 11/00* | (2006.01) |
| *B64C 11/18* | (2006.01) |
| B64C 39/02 | (2023.01) |
| B64U 30/20 | (2023.01) |

(52) U.S. Cl.
CPC ............ *B64C 27/20* (2013.01); *B64C 11/001* (2013.01); *B64C 11/18* (2013.01); *B64C 39/024* (2013.01); *B64U 30/20* (2023.01)

(58) Field of Classification Search
CPC ....... B64C 27/20; B64C 11/001; B64C 11/18; B64C 39/024; B64C 2201/108; B64U 30/20
See application file for complete search history.

(56) References Cited

U.S. PATENT DOCUMENTS

| | | | | |
|---|---|---|---|---|
| 3,212,733 A | * | 10/1965 | Kutney | F04D 25/045 60/228 |
| 3,934,410 A | * | 1/1976 | Williams | F04D 29/547 415/914 |
| 5,096,382 A | * | 3/1992 | Gratzer | B63H 1/16 416/189 |
| 5,503,351 A | * | 4/1996 | Vass | B64C 39/064 244/73 C |

(Continued)

FOREIGN PATENT DOCUMENTS

CA  2887596 A1  7/2015

OTHER PUBLICATIONS

US 10,656,660 B1, 05/2020, Meisenholder et al. (withdrawn)
(Continued)

*Primary Examiner* — Medhat Badawi
(74) *Attorney, Agent, or Firm* — Schwegman Lundberg & Woessner, P.A.

(57) ABSTRACT

A flight-capable drone that can optionally comprise: a body; a plurality of propellers each coupled to and having a fixed rotational axis relative to the body, and a plurality of propeller guards. The plurality of propellers operably configured to enable flight along a flight path. During the flight path the plurality of propellers are pitched forward at an angle relative to the flight path. The plurality of propeller guards are fixedly coupled to the body and have a least a part-annular extent. Each one of the plurality of propeller guards positioned radially adjacent a tip of a corresponding one of the plurality of propellers to protect the corresponding propeller from contact. The plurality of propeller guards are configured as an airfoil along at least a portion of the part-annular extent thereof to generate lift during flight along the flight path.

17 Claims, 10 Drawing Sheets

(56) References Cited

U.S. PATENT DOCUMENTS

| | | | | |
|---|---|---|---|---|
| 5,890,441 | A * | 4/1999 | Swinson | B64C 29/0025 244/12.3 |
| 6,038,295 | A * | 3/2000 | Mattes | H04N 7/147 348/211.3 |
| 6,053,451 | A * | 4/2000 | Yu | B64C 39/001 244/23 C |
| 6,086,016 | A * | 7/2000 | Meek | B64C 27/24 416/223 R |
| 6,227,498 | B1 * | 5/2001 | Arata | B64C 9/26 244/45 R |
| 6,450,446 | B1 * | 9/2002 | Holben | B64C 27/00 244/6 |
| 6,581,872 | B2 * | 6/2003 | Walmsley | B64C 27/20 244/12.4 |
| 6,669,138 | B1 * | 12/2003 | Arrieta | B64C 39/064 244/34 A |
| 6,732,972 | B2 * | 5/2004 | Malvestuto, Jr. | B64C 21/04 244/12.3 |
| 6,819,982 | B2 * | 11/2004 | Doane | B64D 39/00 340/961 |
| 6,834,829 | B2 * | 12/2004 | Dunagin, Jr. | B64C 27/20 244/26 |
| 6,845,941 | B2 * | 1/2005 | Pica | B64C 27/32 244/7 R |
| 6,980,909 | B2 * | 12/2005 | Root | H04L 67/52 702/3 |
| 7,173,651 | B1 * | 2/2007 | Knowles | H04N 1/32411 348/207.1 |
| 7,267,299 | B2 * | 9/2007 | Lamont | B64C 39/08 244/12.3 |
| 7,411,493 | B2 * | 8/2008 | Smith | H04W 4/024 340/539.18 |
| 7,535,890 | B2 * | 5/2009 | Rojas | H04M 3/53366 370/352 |
| 7,542,073 | B2 * | 6/2009 | Li | H04N 13/279 348/39 |
| 7,559,506 | B2 * | 7/2009 | Kissel, Jr. | B64C 39/001 244/17.11 |
| 7,677,502 | B2 * | 3/2010 | Lawson | B64C 9/18 244/58 |
| 7,802,755 | B2 * | 9/2010 | Poltorak | B64C 27/10 244/17.27 |
| 7,971,156 | B2 * | 6/2011 | Albertson | H04L 63/08 715/863 |
| 8,131,597 | B2 * | 3/2012 | Hudetz | G06Q 30/0633 705/26.1 |
| 8,174,562 | B2 | 5/2012 | Hartman | |
| 8,199,747 | B2 | 6/2012 | Rojas et al. | |
| 8,274,550 | B2 * | 9/2012 | Steuart, III | H04N 13/246 348/42 |
| 8,302,901 | B2 * | 11/2012 | Hatton | B64C 17/00 244/12.2 |
| 8,332,475 | B2 * | 12/2012 | Rosen | H04L 65/65 709/200 |
| 8,646,720 | B2 * | 2/2014 | Shaw | B64C 27/20 244/17.23 |
| 8,718,333 | B2 * | 5/2014 | Wolf | G06V 10/462 382/118 |
| 8,724,622 | B2 | 5/2014 | Rojas | |
| 8,874,677 | B2 | 10/2014 | Rosen et al. | |
| 8,909,679 | B2 | 12/2014 | Root et al. | |
| 8,995,433 | B2 | 3/2015 | Rojas | |
| 9,004,973 | B2 * | 4/2015 | Condon | A63H 17/32 446/37 |
| 9,040,574 | B2 * | 5/2015 | Wang | A61K 31/573 514/418 |
| 9,045,226 | B2 * | 6/2015 | Piasecki | B64C 27/32 |
| 9,045,227 | B1 * | 6/2015 | Gramling | B64C 15/02 |
| 9,055,416 | B2 | 6/2015 | Rosen et al. | |
| 9,100,806 | B2 | 8/2015 | Rosen et al. | |
| 9,100,807 | B2 | 8/2015 | Rosen et al. | |
| 9,191,776 | B2 | 11/2015 | Root et al. | |
| 9,204,252 | B2 | 12/2015 | Root | |
| 9,205,922 | B1 * | 12/2015 | Bouwer | G05D 1/0858 |
| 9,225,897 | B1 * | 12/2015 | Sehn | H04N 23/631 |
| 9,276,886 | B1 * | 3/2016 | Samaranayake | G06F 9/451 |
| 9,344,642 | B2 * | 5/2016 | Niemi | H04N 23/667 |
| 9,345,711 | B2 * | 5/2016 | Friedhoff | A61K 31/407 |
| 9,381,988 | B2 * | 7/2016 | Huynh | B63H 1/14 |
| 9,443,227 | B2 * | 9/2016 | Evans | G06Q 10/107 |
| 9,471,059 | B1 * | 10/2016 | Wilkins | G06F 3/167 |
| 9,489,661 | B2 | 11/2016 | Evans et al. | |
| 9,489,937 | B1 * | 11/2016 | Beard | G10K 11/178 |
| 9,491,134 | B2 | 11/2016 | Rosen et al. | |
| 9,576,369 | B2 * | 2/2017 | Venkataraman | G02B 5/20 |
| 9,589,448 | B1 | 3/2017 | Schneider et al. | |
| 9,681,046 | B2 * | 6/2017 | Adsumilli | H04N 23/611 |
| 9,705,831 | B2 * | 7/2017 | Spiegel | H04L 51/216 |
| 9,708,060 | B2 * | 7/2017 | Schwartz | B64C 11/006 |
| 9,723,272 | B2 * | 8/2017 | Lu | B60R 1/00 |
| 9,742,713 | B2 * | 8/2017 | Spiegel | H04L 51/216 |
| 9,747,901 | B1 * | 8/2017 | Gentry | G10L 15/22 |
| 9,922,659 | B2 * | 3/2018 | Bradlow | G05D 1/0094 |
| 9,969,493 | B2 * | 5/2018 | Schlunke | B60V 3/06 |
| 9,989,965 | B2 * | 6/2018 | Cuban | H04N 7/185 |
| 10,061,328 | B2 * | 8/2018 | Canoy | G08G 5/0069 |
| 10,102,423 | B2 * | 10/2018 | Shaburov | A63F 13/837 |
| 10,109,224 | B1 * | 10/2018 | Ratti | G09G 3/005 |
| 10,140,987 | B2 * | 11/2018 | Erickson | G10L 15/28 |
| 10,168,700 | B2 * | 1/2019 | Gordon | B64C 39/024 |
| 10,220,954 | B2 * | 3/2019 | Sun | H01L 23/467 |
| 10,284,508 | B1 * | 5/2019 | Allen | H04L 51/10 |
| 10,293,936 | B1 * | 5/2019 | Conn | B64U 30/20 |
| 10,303,185 | B2 * | 5/2019 | Zhang | H04N 23/90 |
| 10,358,214 | B2 * | 7/2019 | Zhang | B64C 27/08 |
| 10,370,118 | B1 * | 8/2019 | Nielsen | B64C 39/024 |
| 10,377,467 | B2 * | 8/2019 | Huynh | B64C 11/007 |
| 10,377,476 | B2 * | 8/2019 | Mohyi | B64U 10/20 |
| 10,439,972 | B1 * | 10/2019 | Spiegel | H04L 51/216 |
| 10,464,668 | B2 * | 11/2019 | Evulet | B64C 29/02 |
| 10,501,180 | B2 * | 12/2019 | Yu | H04R 1/30 |
| 10,509,466 | B1 * | 12/2019 | Miller | H04N 23/55 |
| 10,514,876 | B2 * | 12/2019 | Sehn | G06F 40/169 |
| 10,526,066 | B2 * | 1/2020 | Suzuki | B64D 27/24 |
| 10,614,855 | B2 * | 4/2020 | Huang | H04N 23/698 |
| 10,669,020 | B2 * | 6/2020 | Vuong | B64C 11/001 |
| 10,689,102 | B2 * | 6/2020 | Tovkach | B64C 29/00 |
| 10,719,080 | B2 * | 7/2020 | Zhang | B64D 45/00 |
| 10,748,347 | B1 * | 8/2020 | Li | G06T 19/20 |
| 10,768,639 | B1 * | 9/2020 | Meisenholder | G06T 7/73 |
| 10,875,658 | B2 * | 12/2020 | Evulet | B64C 15/14 |
| 10,933,966 | B2 * | 3/2021 | Yang | B64B 1/26 |
| 10,958,608 | B1 * | 3/2021 | Allen | H04L 51/42 |
| 10,962,809 | B1 * | 3/2021 | Castañeda | G02B 27/017 |
| 10,967,964 | B2 * | 4/2021 | Kuzikov | F03D 3/061 |
| 10,996,846 | B2 * | 5/2021 | Robertson | G06F 1/163 |
| 10,997,787 | B2 * | 5/2021 | Ge | G06N 3/045 |
| 11,001,378 | B2 * | 5/2021 | Evulet | B64C 3/16 |
| 11,012,390 | B1 * | 5/2021 | Al Majid | H04L 51/10 |
| 11,030,454 | B1 * | 6/2021 | Xiong | G06N 20/00 |
| 11,036,368 | B1 * | 6/2021 | Al Majid | G06F 3/0482 |
| 11,062,498 | B1 * | 7/2021 | Voss | G06F 3/0486 |
| 11,087,728 | B1 * | 8/2021 | Canberk | G06T 7/90 |
| 11,092,998 | B1 * | 8/2021 | Castañeda | G02C 11/10 |
| 11,106,342 | B1 * | 8/2021 | Al Majid | H04L 51/04 |
| 11,126,206 | B2 | 9/2021 | Meisenholder et al. | |
| 11,143,867 | B2 * | 10/2021 | Rodriguez, II | G06F 3/013 |
| 11,148,800 | B2 * | 10/2021 | Hong | B64C 39/04 |
| 11,148,801 | B2 * | 10/2021 | Evulet | B64C 5/06 |
| 11,169,600 | B1 * | 11/2021 | Canberk | G02B 27/017 |
| 11,198,506 | B2 * | 12/2021 | Wallace-Morrison | B64D 17/80 |
| 11,227,626 | B1 * | 1/2022 | Krishnan Gorumkonda | G06F 3/167 |
| 11,292,599 | B2 * | 4/2022 | Park | B64C 39/024 |
| 11,373,538 | B1 * | 6/2022 | Nielsen | H04W 4/40 |
| 2002/0109043 | A1 * | 8/2002 | Li | B64C 27/06 244/12.2 |
| 2003/0062443 | A1 * | 4/2003 | Wagner | B64C 29/0025 244/12.3 |

(56) References Cited

U.S. PATENT DOCUMENTS

| | | | |
|---|---|---|---|
| 2007/0102565 A1* | 5/2007 | Speer | B64D 5/00 |
| | | | 244/2 |
| 2007/0250526 A1 | 10/2007 | Hanna | |
| 2008/0213090 A1* | 9/2008 | Hatton | B64C 39/064 |
| | | | 415/208.1 |
| 2008/0255842 A1* | 10/2008 | Simhi | G10L 17/00 |
| | | | 704/E15.001 |
| 2009/0122133 A1* | 5/2009 | Hartman | H04N 13/218 |
| | | | 348/E13.001 |
| 2009/0283629 A1* | 11/2009 | Kroetsch | A63H 27/12 |
| | | | 244/17.23 |
| 2010/0140416 A1* | 6/2010 | Ohanian, III | B64C 29/02 |
| | | | 244/23 A |
| 2011/0202598 A1 | 8/2011 | Evans et al. | |
| 2012/0194420 A1* | 8/2012 | Osterhout | G06F 3/013 |
| | | | 345/156 |
| 2012/0209924 A1* | 8/2012 | Evans | H04L 51/04 |
| | | | 709/206 |
| 2012/0281885 A1* | 11/2012 | Syrdal | G06V 40/166 |
| | | | 382/116 |
| 2012/0287274 A1* | 11/2012 | Bevirt | H04N 7/185 |
| | | | 348/E7.085 |
| 2013/0056581 A1* | 3/2013 | Sparks | G10K 11/175 |
| | | | 244/1 N |
| 2013/0238168 A1* | 9/2013 | Reyes | H04M 1/72412 |
| | | | 701/2 |
| 2014/0254896 A1* | 9/2014 | Zhou | G07F 17/13 |
| | | | 705/16 |
| 2014/0374532 A1* | 12/2014 | Duffy | G05D 1/104 |
| | | | 244/2 |
| 2015/0022432 A1* | 1/2015 | Stewart | G06F 3/017 |
| | | | 345/156 |
| 2015/0070272 A1* | 3/2015 | Kim | G06F 3/011 |
| | | | 345/156 |
| 2015/0175263 A1 | 6/2015 | Reyes | |
| 2015/0199022 A1* | 7/2015 | Gottesman | G06V 40/28 |
| | | | 382/103 |
| 2015/0287246 A1* | 10/2015 | Huston | G06T 17/00 |
| | | | 345/420 |
| 2015/0331490 A1* | 11/2015 | Yamada | G06F 3/017 |
| | | | 345/156 |
| 2015/0362917 A1* | 12/2015 | Wang | G05D 1/0022 |
| | | | 701/2 |
| 2016/0009376 A1* | 1/2016 | Bucheru | B64C 29/0025 |
| | | | 244/200 |
| 2016/0063987 A1* | 3/2016 | Xu | G10K 11/17881 |
| | | | 381/71.14 |
| 2016/0144967 A1* | 5/2016 | Golshany | B64C 3/32 |
| | | | 29/889.22 |
| 2016/0161946 A1* | 6/2016 | Wuth Sepulveda | G05D 1/0022 |
| | | | 701/2 |
| 2016/0179096 A1* | 6/2016 | Bradlow | B64C 27/00 |
| | | | 701/8 |
| 2016/0229530 A1* | 8/2016 | Welsh | B64C 39/024 |
| 2016/0292886 A1* | 10/2016 | Erad | H04N 23/61 |
| 2016/0307573 A1* | 10/2016 | Wobrock | H04N 23/60 |
| 2016/0336020 A1* | 11/2016 | Bradlow | H04N 7/185 |
| 2016/0340021 A1* | 11/2016 | Zhang | B64C 27/006 |
| 2016/0378108 A1* | 12/2016 | Paczan | G05D 1/104 |
| | | | 705/330 |
| 2017/0031369 A1* | 2/2017 | Liu | G08G 5/0069 |
| 2017/0036762 A1* | 2/2017 | Gamble | B64U 10/25 |
| 2017/0094259 A1* | 3/2017 | Kouperman | H04N 13/111 |
| 2017/0099424 A1* | 4/2017 | Jones | H04N 23/66 |
| 2017/0102699 A1* | 4/2017 | Anderson | G06V 20/17 |
| 2017/0177925 A1* | 6/2017 | Volkart | G08G 5/0039 |
| 2017/0225796 A1* | 8/2017 | Sun | B64D 47/08 |
| 2017/0228690 A1* | 8/2017 | Kohli | G06Q 20/10 |
| 2017/0244937 A1* | 8/2017 | Meier | H04N 23/69 |
| 2017/0320564 A1* | 11/2017 | Kuzikov | F03D 3/062 |
| 2017/0337791 A1* | 11/2017 | Gordon-Carroll | |
| | | | G08B 13/19682 |
| 2017/0341725 A1* | 11/2017 | Skahan | B64C 13/044 |
| 2017/0371353 A1* | 12/2017 | Millinger, III | G05D 1/0094 |
| 2018/0082682 A1* | 3/2018 | Erickson | G05D 1/0094 |
| 2018/0208296 A1* | 7/2018 | Mores | B64C 11/001 |
| 2018/0246529 A1* | 8/2018 | Hu | B64C 39/024 |
| 2019/0011921 A1* | 1/2019 | Wang | G05D 1/106 |
| 2019/0245365 A1* | 8/2019 | Farrahi Moghaddam | |
| | | | B60L 53/14 |
| 2020/0023959 A1* | 1/2020 | Breeze-Stringfellow | |
| | | | B64C 29/0025 |
| 2020/0241575 A1* | 7/2020 | Meisenholder | G05D 1/12 |
| 2020/0324893 A1* | 10/2020 | Mills | B64C 37/02 |
| 2020/0391859 A1* | 12/2020 | Groninga | B64C 29/0033 |
| 2021/0011612 A1* | 1/2021 | Dancie | G06F 3/0488 |
| 2021/0030314 A1* | 2/2021 | O'Connor | G01B 11/06 |
| 2021/0038250 A1* | 2/2021 | Li | A61B 17/3415 |
| 2021/0074016 A1* | 3/2021 | Li | G06F 3/011 |
| 2021/0166732 A1* | 6/2021 | Shaburova | G06N 20/00 |
| 2021/0241529 A1* | 8/2021 | Cowburn | H04N 7/157 |
| 2021/0303075 A1* | 9/2021 | Cowburn | G06F 3/011 |
| 2021/0303077 A1 | 9/2021 | Anvaripour et al. | |
| 2021/0303140 A1 | 9/2021 | Mourkogiannis | |
| 2021/0362848 A1* | 11/2021 | Spencer | G05D 1/0858 |
| 2021/0382503 A1 | 12/2021 | Meisenholder et al. | |
| 2021/0382564 A1 | 12/2021 | Blachly et al. | |
| 2021/0397000 A1 | 12/2021 | Rodriguez, II | |
| 2021/0403155 A1* | 12/2021 | Neiser | B64D 27/24 |
| 2022/0089279 A1* | 3/2022 | Rosen | B64C 29/0033 |
| 2022/0252080 A1* | 8/2022 | Mosiewicz | B64C 11/18 |
| 2023/0059272 A1* | 2/2023 | Nielsen | G05D 1/0016 |
| 2023/0165697 A1* | 6/2023 | Baranowski | A61M 25/0074 |
| | | | 623/1.11 |
| 2023/0165700 A1* | 6/2023 | Gomez | A61F 5/30 |
| | | | 600/27 |
| 2023/0165765 A1* | 6/2023 | Ward, Jr. | A61Q 3/02 |
| | | | 424/61 |
| 2023/0165978 A1* | 6/2023 | Khoo | A61K 41/0057 |
| | | | 424/9.6 |
| 2023/0166180 A1* | 6/2023 | Li | A63F 13/24 |
| | | | 463/37 |
| 2023/0166193 A1* | 6/2023 | Greige | A63F 13/798 |
| | | | 463/23 |
| 2023/0167381 A1* | 6/2023 | Chou | C11D 1/83 |
| | | | 430/326 |
| 2023/0167926 A1* | 6/2023 | Huang | F16L 25/0054 |
| | | | 285/382 |
| 2023/0167969 A1* | 6/2023 | Kennedy | F21S 4/10 |
| | | | 362/396 |
| 2023/0167972 A1* | 6/2023 | Tress | F21S 9/02 |
| | | | 362/133 |
| 2023/0168013 A1* | 6/2023 | Bush | F25B 47/022 |
| | | | 62/81 |
| 2023/0168136 A1* | 6/2023 | Rodrigues | G01K 11/00 |
| | | | 374/161 |
| 2023/0168235 A1* | 6/2023 | Kessler | G01N 5/00 |
| | | | 73/61.41 |
| 2023/0168928 A1* | 6/2023 | Schneider | H03M 7/3086 |
| | | | 712/220 |
| 2023/0169001 A1* | 6/2023 | Dingler | G06F 12/127 |
| | | | 711/118 |
| 2023/0169036 A1* | 6/2023 | Xiang | G06F 3/067 |
| | | | 707/692 |
| 2023/0169149 A1* | 6/2023 | Wakabayashi | G06V 10/25 |
| | | | 382/159 |
| 2023/0169175 A1* | 6/2023 | Ananthapur Bache | G06N 3/08 |
| | | | 726/25 |
| 2023/0169251 A1* | 6/2023 | Riepe | G06F 30/392 |
| | | | 716/100 |
| 2023/0169316 A1* | 6/2023 | Mills | G06F 7/78 |
| | | | 706/15 |
| 2023/0169325 A1* | 6/2023 | Xie | G06N 3/09 |
| | | | 706/15 |
| 2023/0169326 A1* | 6/2023 | Sidiya | G06N 3/047 |
| | | | 706/15 |
| 2023/0169376 A1* | 6/2023 | Griffin | G06N 10/80 |
| | | | 716/100 |

(56) References Cited

U.S. PATENT DOCUMENTS

| | | | |
|---|---|---|---|
| 2023/0169388 A1* | 6/2023 | Huang | G06N 3/045 706/12 |
| 2023/0169389 A1* | 6/2023 | Zhou | G06N 3/084 706/15 |
| 2023/0169517 A1* | 6/2023 | Garner, IV | G06Q 40/02 705/35 |
| 2023/0169625 A1* | 6/2023 | Kumar | G06T 7/70 382/284 |
| 2023/0169632 A1* | 6/2023 | Kulkarni | G06T 7/181 382/276 |
| 2023/0169732 A1* | 6/2023 | Wickramasinghe | G06V 10/82 345/423 |
| 2023/0169855 A1* | 6/2023 | Wu | G08G 1/0116 340/907 |
| 2023/0170100 A1* | 6/2023 | Chen | G16H 70/60 705/2 |
| 2023/0170428 A1* | 6/2023 | Moselund | H01L 21/02505 257/14 |
| 2023/0171145 A1* | 6/2023 | Hossain | H04L 41/14 709/224 |
| 2023/0171190 A1* | 6/2023 | Vasseur | H04L 43/08 370/389 |
| 2023/0171452 A1* | 6/2023 | Bonner | G06Q 30/0224 705/14.1 |
| 2023/0171644 A1* | 6/2023 | Gan | H04W 28/095 370/235 |
| 2023/0171774 A1* | 6/2023 | Liu | H04L 1/1607 370/329 |

OTHER PUBLICATIONS

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: < URL: http://www.theregister.co.uk/2005/12/12/stealthtext/>, (Dec. 12, 2005), 1 pg.

Meisenholder, David, et al., "Remoteless Control of Drone Behavior", US Application Serial No. 15/640, 143, filed Jun. 30, 17, 108 pgs.

Pourmehr, Shokoofeh, et al., "You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, "iSphere: Self-Luminous Spherical Drone Display", Proceedings of the 30th Annual ACM Symposium on User Interface Software and Technology (UIST), Quebec City, CA, (Oct. 22-25, 2017), 635-343.

\* cited by examiner

DRONE WITH PROPELLER GUARD CONFIGURED AS AN AIRFOIL

CLAIM OF PRIORITY

This application claims the benefit of priority to U.S. Patent Application Ser. No. 62/825,463, filed on Mar. 28, 2019, which is incorporated herein by reference in its entirety.

TECHNICAL FIELD

Embodiments of the present disclosure relate generally to autonomous vehicles such as aerial drones. More particularly, but not by way of limitation, the present disclosure pertains to a propeller guard for a drone that can act as a wing to generate lift.

BACKGROUND

An unmanned aerial vehicle (also known as an aerial drone and occasionally referred to herein simply as a drone) often forms part of an unmanned aircraft system (UAS) that includes the drone, a remote control device, and a system for communication between the drone and the remote control device. Some systems provide for drone control by an operator without use of a remote control device.

Drones are often used for relatively low-altitude flight, typically within viewing range of persons at ground level. Many drones have multiple motors that drive respective spinning propellers to generate lift, with a control system typically maintaining stability of the drone by varying the rotational speeds of the respective propellers.

BRIEF DESCRIPTION OF THE DRAWINGS

Various ones of the appended drawings merely illustrate example embodiments of the present disclosure and should not be considered as limiting its scope.

The headings provided herein are merely for convenience and do not necessarily affect the scope or meaning of the terms used.

DETAILED DESCRIPTION

Traditionally, drones have utilized propeller guards that protect the propellers from contacting objects when operational in close proximity to objects or persons. In this manner, the propeller guards act as safety features protecting persons and objects as well as the propellers. Unfortunately, propeller guards have not been designed with aerodynamics in mind but rather safety. As such, they produce drag rather than lift during forward flight. Additionally, propeller guards add additional weight and can constrict airflow. This can have a negative effect on efficiency and performance.

Figure 2:
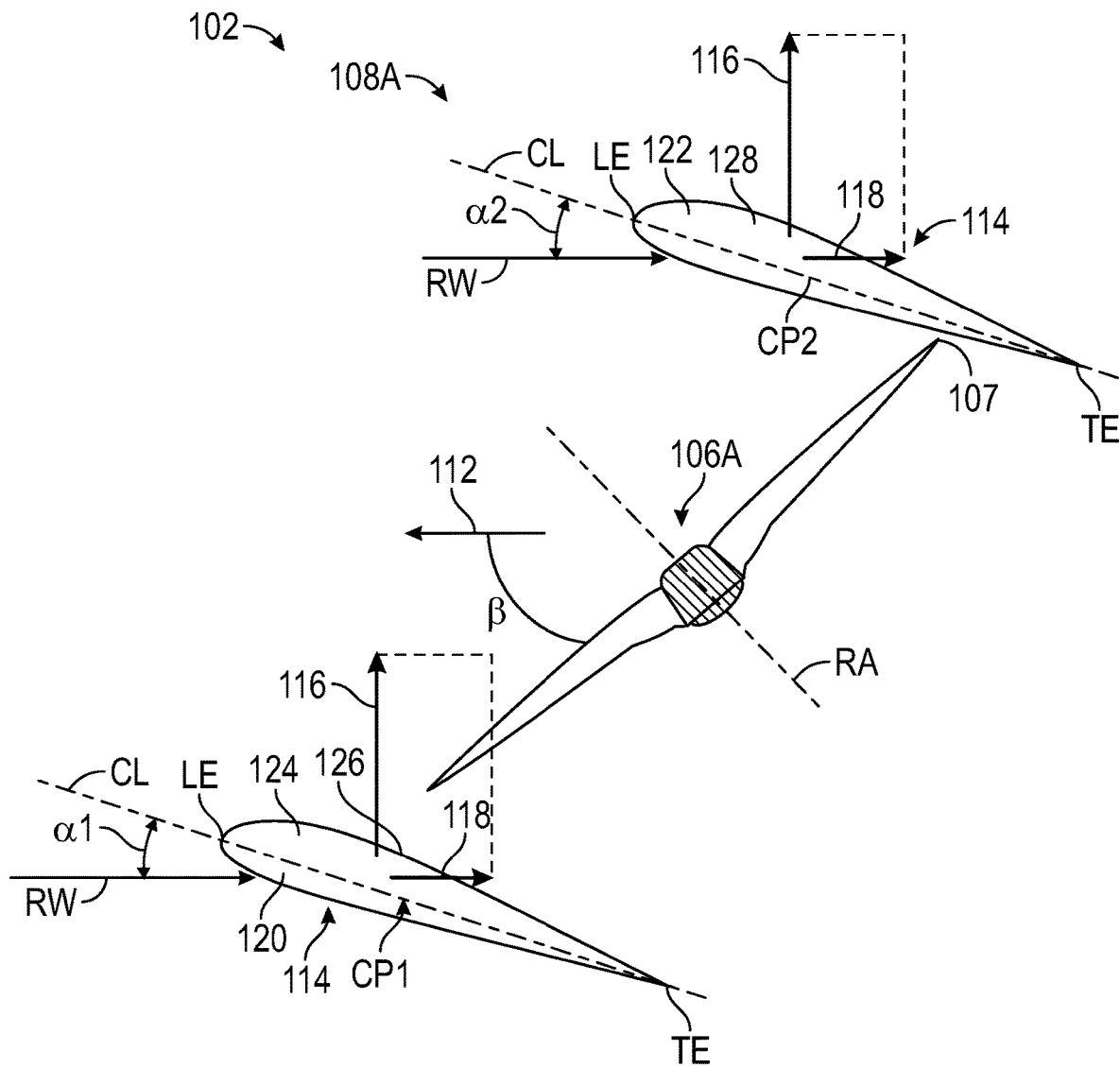
FIG. 2 is a cross-sectional view through a first of the propeller guards of FIG. 1 showing an angulation of the propeller guard on a first side and a second side relative the horizontal plane during forward flight, FIG. 2 also schematically illustrates aerodynamics of the first propeller guard including lift generated thereby in forward flight, according to one embodiment.
Figure 3:
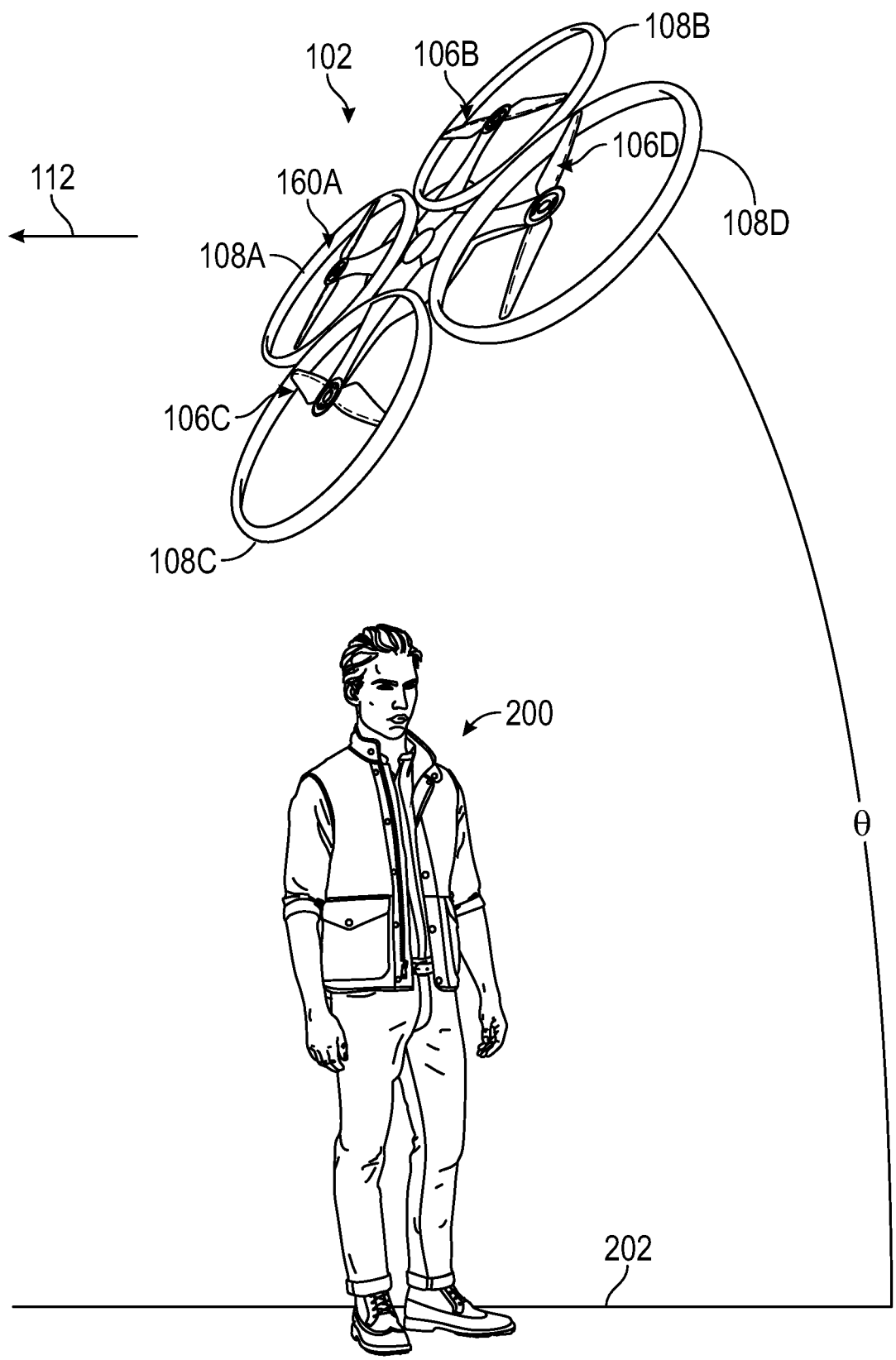
FIG. 3 is an exemplary forward flight path of the drone of FIGS. 1 and 2 with the drone having the propellers pitched forward and the propeller guards with an angle of attack relative to the horizontal, according to one embodiment.

The present application discloses drones having aerodynamically shaped propeller guards. More particularly, these propeller guards can be shaped as an airfoil and can be angled relative to the horizontal plane (angle of attack), such that the wings provide optimum lift/drag when the drone is naturally angled and in forward flight. As shown in FIGS. 2 and 3 for example, during a forward flight the propeller guards are configured to be angled relative to a forward flight path (i.e. can have an angle of attack) and are configured to generate lift. This angulation can also result in reduced drag relative to traditional propeller guards. Both full (continuous annular) propeller guards (see FIGS. 1-3) and partial propeller guards (e.g., part-annular see FIGS. 4 and 5) shaped as airfoils are contemplated. In the full propeller guard design, the propeller guards are not symmetrically shaped along their annular extents such that in cross-section the annular guard changes shape along its annular extent. Indeed, the full propeller guard design can have a first portion with a first upper chamber that interfaces with the tip of the corresponding one of the plurality of propellers and a second opposing portion with a second upper chamber that is spaced across the chord line from the tip of the corresponding one of the plurality of propellers.

Figure 1:
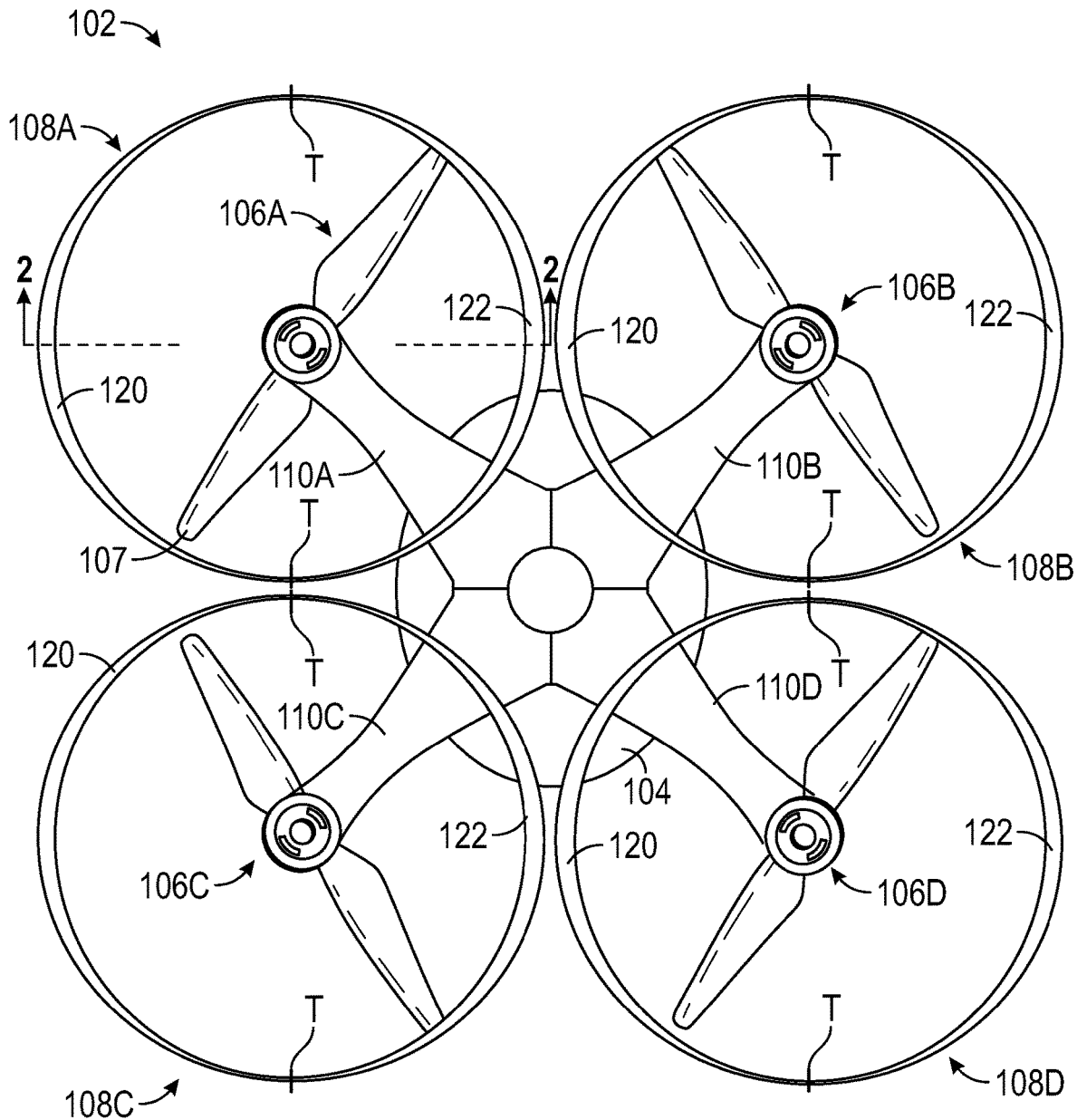
FIG. 1 is a top down plan view of a drone having full propeller guards configured as wings, according to one embodiment.

FIG. 1 shows a plan view of a top of a drone 102 according to an embodiment of the present application. The drone can include a body 104, a plurality of propellers 106A, 106B, 106C and 106D, and a plurality of propeller guards 108A, 108B, 108C and 108D. The body 104 includes propeller mounts 110A, 110B, 110C and 110D.

The plurality of propellers 106A, 106B, 106C and 106D are coupled to the body 104 via the propeller mounts 110A, 110B, 110C and 110D, respectively. Similarly, the plurality of propeller guards 108A, 108B, 108C and 108D are coupled to the body 104. In some cases, this coupling/connection can be via the propeller mounts 110A, 110B, 110C and 110D or another fairing or strut that is not specifically shown. Although four propellers and four propeller guards are shown in the embodiment of FIG. 1 and are configured as will be described subsequently, it is contemplated that relatively more or fewer propellers and propeller guards can be utilized in other embodiments and that not all the propeller guards utilized with the drone need to be configured in the manner described subsequently. Rather only some of the propeller guards may be configured in such a manner.

In the embodiment of FIG. 1, the body 104 can be configured to house various hardware for operation of the drone 102. This hardware is not specifically illustrated in FIG. 1 but can include one or more motors, a hardware processor, accelerometer, motor controller, electronic hardware memory, communication hardware (bus), and sensors (touch, sound, image, etc.), for example. If utilized the electronic hardware memory can be integrated with the hardware processor, for example. The memory can store instructions that configure the hardware processor to perform one or more of the functions. In some examples, the hardware housed by the drone can be such as that illustrated in FIG. 6.

The one or more motors can be coupled to drive rotation of the plurality of propellers 106A, 106B, 106C and 106D. This can be via rotors (not shown) extending through the propeller mounts 110A, 110B, 110C and 110D, respectively. The one or more motors can be operably connected to the motor controller, allowing the motor controller (or in some cases the hardware processor) to control a speed of rotation of each of the rotors, and hence, a speed of rotation of each of the plurality of propellers 106A, 106B, 106C and 106D. As is further described and illustrated such as in FIG. 3, the plurality of propellers 106A, 106B, 106C and 106D are operably configured to propel the body 104 into flight including along a forward flight path.

In the embodiment of FIGS. 1 and 2, each of the plurality of propellers 106A, 106B, 106C and 106D have a fixed rotational axis (RA-shown in FIG. 2) relative to the body 104 and the plurality of propeller guards 108A, 108B, 108C and 108D. Described another way, the propeller mounts 110A, 110B, 110C and 110D and/or the plurality of propellers 106A, 106B, 106C and 106D comprise structures that have a fixed spatial relationship to the body 104 and are incapable of pivoting or another type of movement relative thereto. Similarly, the plurality of propeller guards 108A, 108B, 108C and 108D can be fixedly coupled to the body 104 such that they are incapable of pivoting or another type of movement relative to the body 104 or the plurality of propellers 106A, 106B, 106C and 106D. Hence, although the drone 102 is capable of vertical takeoff and landing, the drone 102 of FIGS. 1-3 is not configured as with rotatable propellers and/or wings as would be the case with many Vertical Take-off and Landing (VTOL) aircraft. However, in other embodiments it is contemplated that the drone 102 could be configured to have propeller guards, mounts or propellers that are moveable in the manner of many VTOL aircraft.

As shown in FIGS. 1 and/or 2, the plurality of propeller guards 108A, 108B, 108C and 108D each have a generally annular shape and are positioned adjacent a tip 107 of a corresponding one of the plurality of propellers 106A, 106B, 106C and 106D to protect the corresponding one of the plurality of propellers 106A, 106B, 106C and 106D from contact (e.g., with an operator or another object). FIGS. 1-3, illustrate an embodiment where the plurality of propeller guards 108A, 108B, 108C and 108D comprise continuous propeller guards. As FIG. 1 is a top down view of the drone 102, it illustrates the plurality of propeller guards 108A, 108B, 108C and 108D are angled relative to the body 104 and the respective ones of the plurality of propellers 106A, 106B, 106C and 106D. Indeed, the plurality of propeller guards 108A, 108B, 108C and 108D are angled relative to various other features such as the forward flight path (illustrated in FIGS. 2 and 3), relative wind RW and the horizontal. As shown in FIG. 2, this angulation provides each of the plurality of propeller guards 108A, 108B, 108C and 108D with an angle of attack $\alpha 1$, $\alpha 2$ along portions thereof relative to the forward flight path 112 and the relative wind RW. During the forward flight path 112, the plurality of propellers 106A, 106B, 106C and 106D are pitched forward at an angle $\beta$ relative to the forward flight path 112. The angle $\beta$ can be between 60 degrees and 90 degrees.

As also shown in FIG. 2, the plurality of propeller guards 108A, 108B, 108C and 108D are each configured as an airfoil 114 along one or more portions of the annular extent thereof. As such, each of the plurality of propeller guards 108A, 108B, 108C and 108D as shown in FIG. 2, defines, in cross-section, a chord line CL, a leading edge LE with a radius, a trailing edge TE, a center of pressure CP and an aerodynamic cross-sectional shape (outline) with an upper chamber that differs in shape from a lower chamber. This configuration of the plurality of propeller guards 108A, 108B, 108C and 108D generates lift 116 and reduces drag 118 during travel along the forward flight path 112.

According to the example of FIG. 2, the plurality of propeller guards 108A, 108B, 108C and 108D are non-symmetrically shaped along a propeller interfacing surface such that only a portion of the propeller interfacing surface is contoured to produce the lift. As shown in FIGS. 1 and 2, each of the plurality of propeller guards 108A, 108B, 108C and 108D can have a first portion 120 and an annularly opposite second portion 122 that are differently shaped relative to one another. Both the first portion 120 and the second portion 122 can be part-annular in shape but are not a full annulus in such shape. Rather, they connect together at a transition T (FIG. 1). The propeller guard may not be configured as an airfoil at this transition T, and indeed, the chamber surfaces may change to flat surfaces prior to the transition T. The first portion 120 can oppose the second portion 122 across one of the plurality of propellers 106A, 106B, 106C and 106D and can be differently shaped with respect thereto due to a differ orientation of the first portion 120 with respect to the second portion 122. According to the example of FIGS. 1 and 2, this different shape can comprise an asymmetric shape in at least two dimensions. The transition T between the first portion 120 and the second portion 122 is indicated in FIG. 1.

As shown in FIG. 1, the first portion 120 has a first upper chamber 124 that interfaces with the tip 107 of the corresponding one of the plurality of propellers 106A, 106B, 106C and 106D. In particular, the first upper chamber 124 forms an inner annular surface 126 that interfaces with the tip 107. The second portion 122 has a second upper chamber 128 that is spaced across the chord line CL from the tip 107 of the corresponding one of the plurality of propellers 106A, 106B, 106C and 106D. Thus, the second upper chamber 128 does not form a portion of the inner annular surface. Here the terms such as "upper" and "lower" refer to the orientation of the propeller guard during the forward flight path 112 and result from the configuration (orientation/shape/relative positioning of portions, etc.) of the propeller guard. The term "forward" or "leading" and "rearward" or "trailing" refers to the orientation of the propeller guard during the forward flight path 112 and result from the configuration (orientation/shape/relative positioning of portions, etc.) of the propeller guard. Thus, the leading edge would experience airflow over it prior to the same airflow reaching the trailing edge, for example.

As further illustrated in the embodiment of FIG. 2, the plurality of propeller guards 108A, 108B, 108C and 108D are configured such that, during the forward flight path 112, the first portion 120 has a first center of pressure CP1 that is positioned forward of the tip 107 of the corresponding one of the plurality of propellers 106A, 106B, 106C and 106D and the second portion 122 has a second center of pressure CP2 that is positioned rearward of the tip 107 of the corresponding one of the plurality of propellers 106A, 106B, 106C and 106D. The plurality of propeller guards 108A, 108B, 108C and 108D are configured such that, during the forward flight path 112, the first center of pressure CP1 of the first portion 120 is positioned forward of the leading edge LE of the second portion 122. Additionally, the plurality of propeller guards 108A, 108B, 108C and 108D can be configured such that the first portion 120 and the second portion 122 have a same angle of attack α1, α2 between the chord line CL thereof and the forward flight path 112 but different second angles between the chord line CL thereof and the corresponding one of the plurality of propellers 106A, 106B, 106C and 106D. The plurality of propeller guards 108A, 108B, 108C and 108D can be configured such that the first portion 120 and the second portion 122 each have an identical shape at the leading edge LE so as to have a same radius. As shown in FIG. 2, the plurality of propeller guards 108A, 108B, 108C and 108D are configured (angled relative to the forward flight path 112) such that the leading edge LE of the first portion 120 is positioned forward of the leading edge LE of the second portion 122 during the forward flight path 112.

FIG. 3 shows the drone 102 during the forward flight path 112 relative to an operator (pilot) 200 and a horizontal 202. As shown in FIG. 3, as a result of the configuration and relative positioning of the plurality of propellers 106A, 106B, 106C and 106D and the plurality of propeller guards 108A, 108B, 108C and 108D the drone 102 has a tilt during forward flight, thus having an angle θ relative to the horizontal 202.

Figure 4:
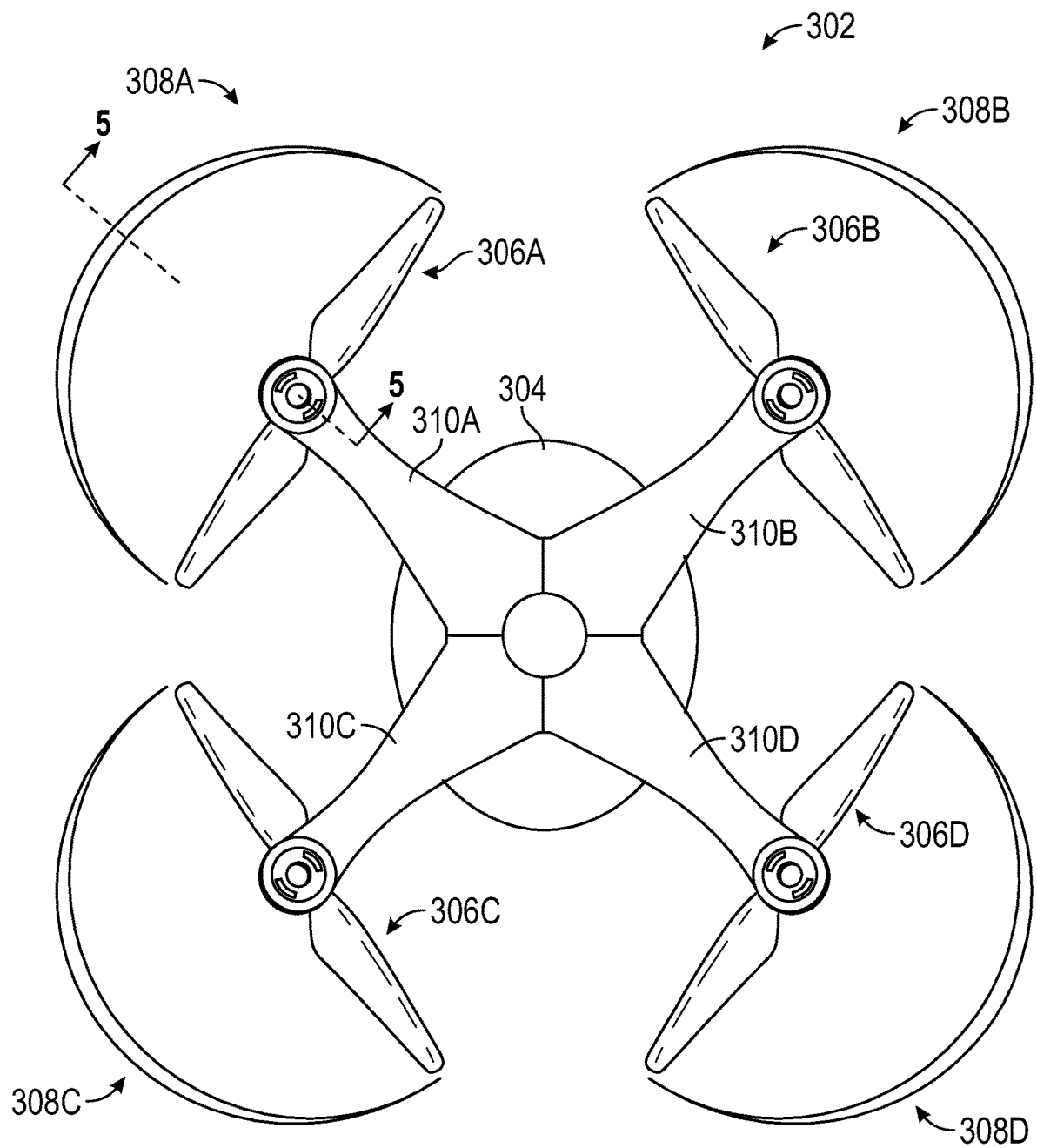
FIG. 4 is a top down plan view of a drone having partial propeller guards configured as wings, according to one embodiment.
Figure 5:
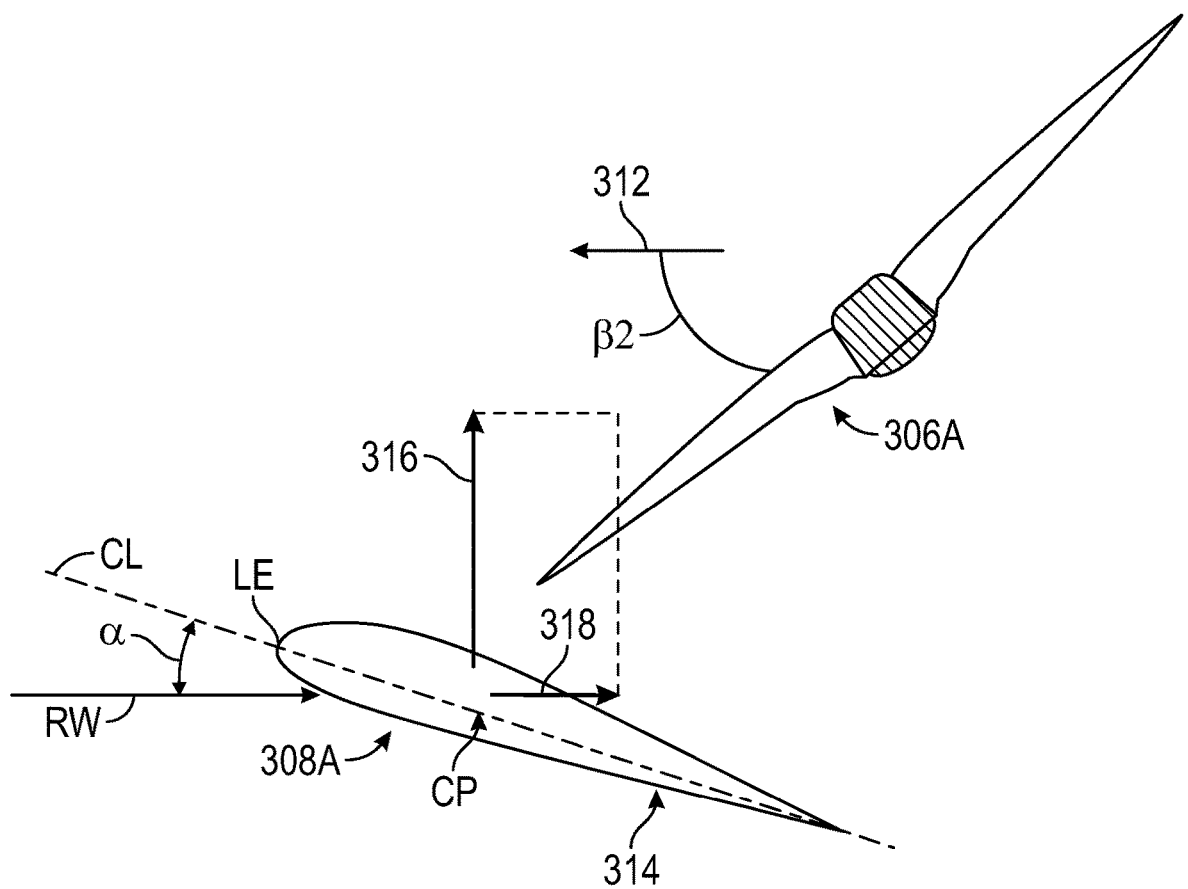
FIG. 5 is a cross-sectional view through a first of the propeller guards of FIG. 4 showing an angulation of the propeller guard on a first side and a second side relative to the horizontal plane during forward flight, FIG. 5 also schematically illustrates aerodynamics of the first propeller guard including lift generated thereby in forward flight, according to one embodiment.

FIGS. 4 and 5 show an alternative drone 302 that has a similar configuration to the drone 102 but has partial propeller guards (i.e. the propeller guards do not have a full annular ring shape). Put another way, the partial propeller guards only extend annularly along a portion of rotational path of the propellers. In other respects the drone 302 can be configured in the manner of the drone 102 previously described. For example, the drone 302 can include a body 304, a plurality of propellers 306A, 306B, 306C and 306D, and a plurality of propeller guards 308A, 308B, 308C and 308D. The body 304 includes propeller mounts 310A, 310B, 310C and 310D. A specific connection of the plurality of propeller guards 308A, 308B, 308C and 308D is not shown in FIG. 4, but would be via fairing or shroud to the body 304, for example.

As shown in FIGS. 4 and/or 5, the plurality of propeller guards 308A, 308B, 308C and 308D each have a generally annular shape and are positioned radially adjacent a tip 307 of a corresponding one of the plurality of propellers 306A, 306B, 3106C and 306D for a portion of the rotational length thereof to protect the corresponding one of the plurality of propellers 106A, 106B, 106C and 106D from contact (e.g., with an operator or another object). As FIG. 4 is a top down view of the drone 302, this FIGURE illustrates the plurality of propeller guards 308A, 308B, 308C and 308D are angled relative to the body 304 and the respective ones of the plurality of propellers 306A, 306B, 306C and 306D. Indeed, the plurality of propeller guards 308A, 308B, 308C and 308D are angled relative to various other features such as the forward flight path 312 (illustrated in FIG. 5), relative wind RW and the horizontal. As shown in FIG. 5, this angulation provides each of the plurality of propeller guards 308A, 308B, 308C and 308D with an angle of attack α along portions thereof relative to the forward flight path 312 and the relative wind RW. During the forward flight path 312, the plurality of propellers 306A, 306B, 306C and 306D are pitched forward at an angle β2 relative to the forward flight path 312. The angle β2 can be between 60 degrees and 90 degrees.

As also shown in FIG. 5, the plurality of propeller guards 308A, 308B, 308C and 308D are each configured as an airfoil 314 along one or more portions of the annular extent thereof. As such, each of the plurality of propeller guards 308A, 308B, 308C and 308D as shown in FIG. 5 includes a chord line CL, a leading edge LE with a radius, a trailing edge, a center of pressure CP and an aerodynamic shape with an upper chamber that differs in shape from a lower chamber. This configuration of the plurality of propeller guards 308A, 308B, 308C and 308D generates lift 316 and reduces drag 318 during the forward flight path 312.

Figure 6:
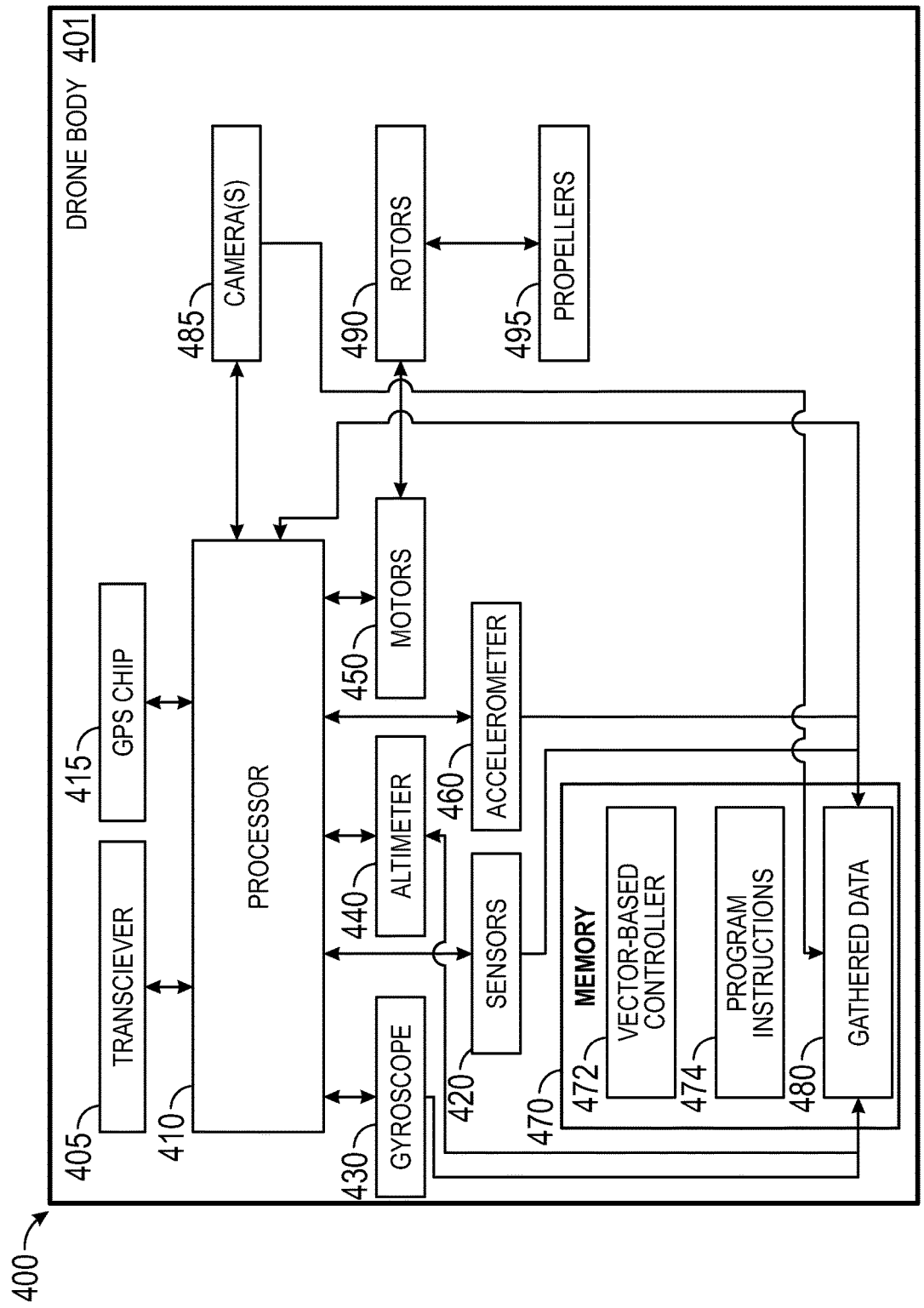
FIG. 6 represents an exemplary simplified drone having various sensors, a processor, memory, a communication module, and other components, according to one embodiment.

FIG. 6 represents an exemplary simplified drone 400, that can comprise either drone 102 or drone 302 or another drone not specifically illustrated previously, for example. The drone 400 comprises a drone body 401. In one embodiment, the drone may be a quadcopter similar to those previously illustrated having a body housing an electrically powered drive mechanism to drive, for example, four rotors 490 mounted on drone body 401 in order to provide aerodynamic lift to the drone 400, as well as to accelerate and rotate the drone 400 during the flight path previously illustrated. The rotors 490 are actuated by motors 450 in response to instructions executed by a processor 410, and act to spin the propellers 495 with a rotation rate as desired. In one embodiment, the drone 400 may comprise one or more removable battery sources (not illustrated) to power, among others, the rotors 490. Having more than one motor 450 gives the drone 400 more fail-safes. For instance, if one of the motors fails, the drone 400 can still stay aloft with the remaining motors working in concert to compensate. In addition, the more rotors that are incorporated into the drone body 401, the more lift the drone 400 will generate, allowing the drone to carry a heavier payload such as one or more cameras 485, etc.

Figure 7:
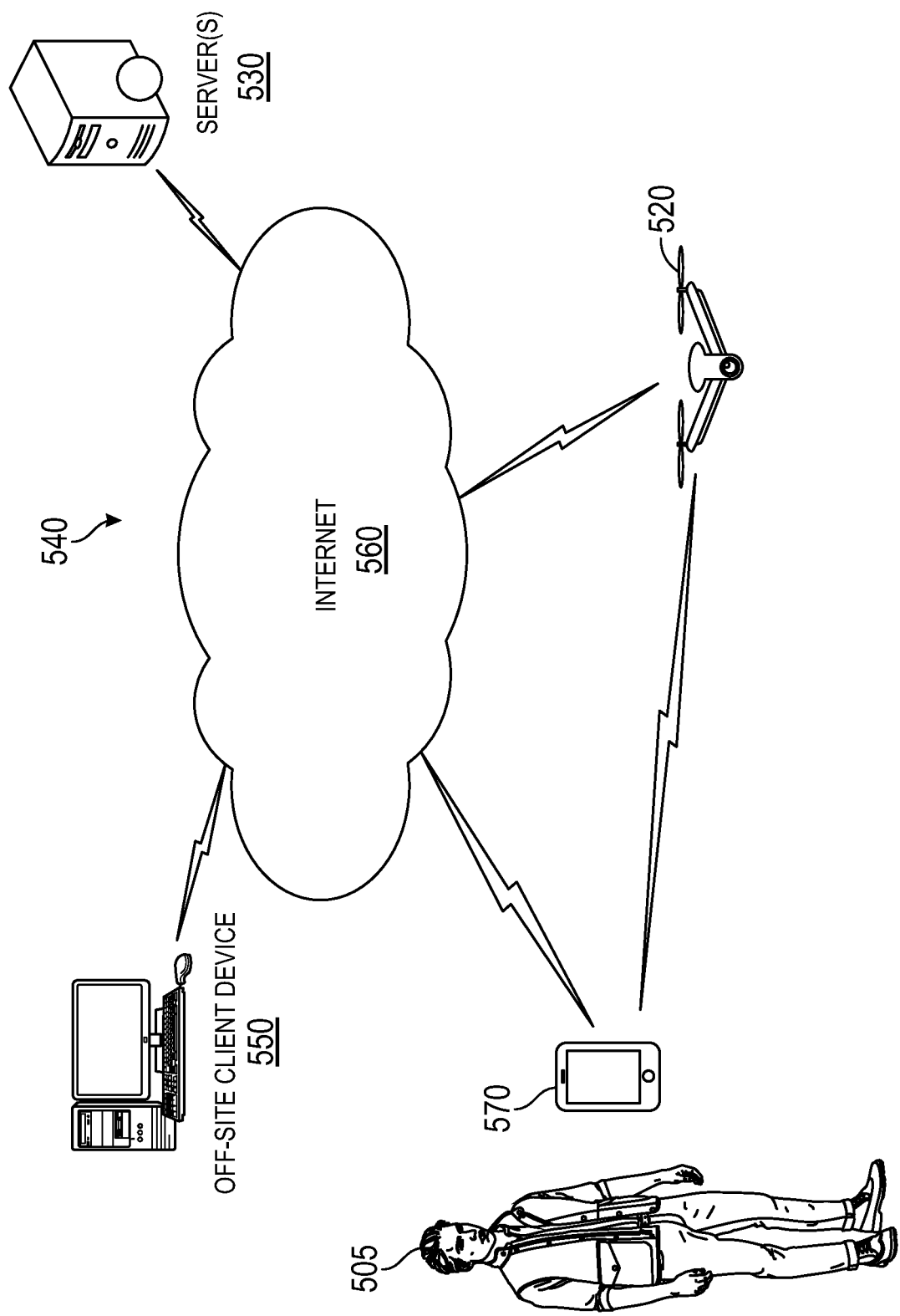
FIG. 7 is a schematic diagram illustrating a drone system, according to one embodiment.

In one embodiment, drone 400 further includes the one or more cameras 485 mounted on the drone body 401. For example, a front camera may be mounted onto the drone body 401, where this camera is positioned to pick up images of the scene towards which the drone is directed. In addition, one or more auxiliary cameras or a vertically-directed camera may be mounted on the drone body 401. The vertically-directed camera can be positioned to pick up images of the terrain being overflown. The one or more cameras 485 may be movably or fixedly mounted on the drone body 401, being coupled to the body 401 via one or more actuators or other mechanisms to control orientation of the one or more cameras 485 relative to the drone body 401. Data such as video and digital images captured by cameras 485 may be stored in a memory 470, e.g., as gathered data 480. Further, data captured by cameras 485 may be streamed wirelessly in near-real time to a control device or to one or more server or client system as illustrated in FIG. 7.

In order to take flight, the drone 400 may require a controller, e.g., a remote control device that an operator may use to launch, land, and navigate drone 400. Contemplated controllers can take many forms, from gamepad-like controllers to smartphones and tablets. Regardless of their design, controllers require communication with the drone 400, and typically do that using radio waves or another form of wireless communication modality. For example, drones are typically run by 2.4 gigahertz radio waves. To communicate with a drone, many drone controllers use Wi-Fi, which can be transmitted on the 2.4 gigahertz spectrum, and is used by smartphones and tablets for communication. In one embodiment, the drone 400 communicates with one or more controllers or remote control devices (not illustrated in FIG. 6) via transceiver 405.

In one embodiment, modern onboard drone technology includes a GPS chip 415 inside the drone body 401 that relays location of the drone 400 to the controller. It also logs, for example, in the memory 470, the takeoff spot of drone 400 and other significant geographical features indicated by the operator. The takeoff spot may be used in case the drone 400 needs to return unassisted. The GPS chip 415 provides accurate position of the drone 400 and allows for auto-pilot features or for methods, as described herein, for movement control based on a spatial vector and an angle the plurality of propellers are pitched forward relative to the flight path. The GPS chip 415 can allow the drone 400 to follow a pre-programmed path; return home or to a starting position autonomously if the drone 400 loses data connection or flies out of range; and also to operate in follow mode in which the drone 400 follows the operator at a specified altitude and distance. In one embodiment, GPS technology is not necessary prerequisite methods for controlling the drone's movement based on the spatial vector and the angle the plurality of propellers are pitched forward relative to the flight path.

An accelerometer 460 in conjunction with a gyroscope 430 and an altimeter 440 can be used as onboard sensors that keep the drone 400 aloft. For instance, the altimeter 440 is an instrument for determining attained altitude, e.g., especially used in aircrafts. So, when the drone 400 is set to hover in place, the altimeter 440 can instruct the drone 400 to maintain that height. In addition, the GPS chip 415 allows the drone 400 to be held within the certain longitudinal and latitudinal coordinates, correcting course when necessary such as when there is wind. The accelerometer 460 is a device that measures acceleration and velocity and is used in drones for flight stabilization. Together or alone the GPS chip 415, the altimeter 440, the gyroscope 430 and/or the accelerometer 460 can generate data that is used to compute the spatial vector, for example. The gyroscope 430 is instrument for measuring and maintaining orientation that can be used to determine the angle the plurality of propellers are pitched forward relative to the flight path. Sensors 420 may be additional navigational or motion sensors or other types of sensors concerned with sensing the surrounding environment, or any other suitable type of sensor.

In one embodiment, navigation including the spatial vector and one or more of the angle the plurality of propellers are pitched forward relative to the flight path, an angle of attack of one or more portions of the plurality of propeller guards at a leading edge of the drone or a center of pressure of one or more portions of the plurality of propeller guards of the drone 400 may be pre-programmed and a route to be represented as a machine readable program instruction 474 loaded into memory 470 of drone 400. Alternatively or in addition, movement of the drone 400 may be controlled by vector-based controller component 472 embodied in machine readable program instruction loaded into the memory 470 and executed by the processor 410, according to various methods, systems, etc. A flight route for the drone 400 including the spatial vector and the angle the plurality of propellers are pitched forward relative to the flight path, an angle of attack of one or more portions of the plurality of propeller guards at a leading edge of the drone or a center of pressure of one or more portions of the plurality of propeller guards may be computed based on various criteria (desired operational input such as speed, the horizontal, the vertical, take-off location, landing location, the operator location, certain geographic feature location, sensed criteria such as wind speed and direction, altitude, sensed landscape features, payload etc.) as implemented by the vector-based controller 472. In this manner, the vector-based controller 472 can automatically control the drone during flight to adopt the angular orientation resulting in the angles of attack shown in FIGS. 1-5, for example.

FIG. 7 is a schematic diagram illustrating a drone system 500 of which a drone 520 such as those previously described may in some embodiments form a part. In embodiments such as that shown in FIG. 7, the drone 520 may, instead of or in addition to an on-site control device (e.g., mobile phone 510), be communicatively coupled via a distributed network (e.g., the Internet 560), to one or more off-site client devices 550 and/or to one or more servers 530 providing various online services. In some instances, communication between the on-site remote control device 510 and the drone 520 may be via the Internet 560 (e.g., by means of a cellular telephone network). In some embodiments, the server 530 may provide a social networking service, to enable communication of content (e.g., photos, videos, status updates, media content messages, and the like) directly to social media sites from the drone 520, in flight. For example, data captured by cameras of drone 520 may be broadcasted or otherwise communicated wireless in near-real time to a control device such as mobile phone 510 or to one or more server 530 or client systems 550.

Figure 8:
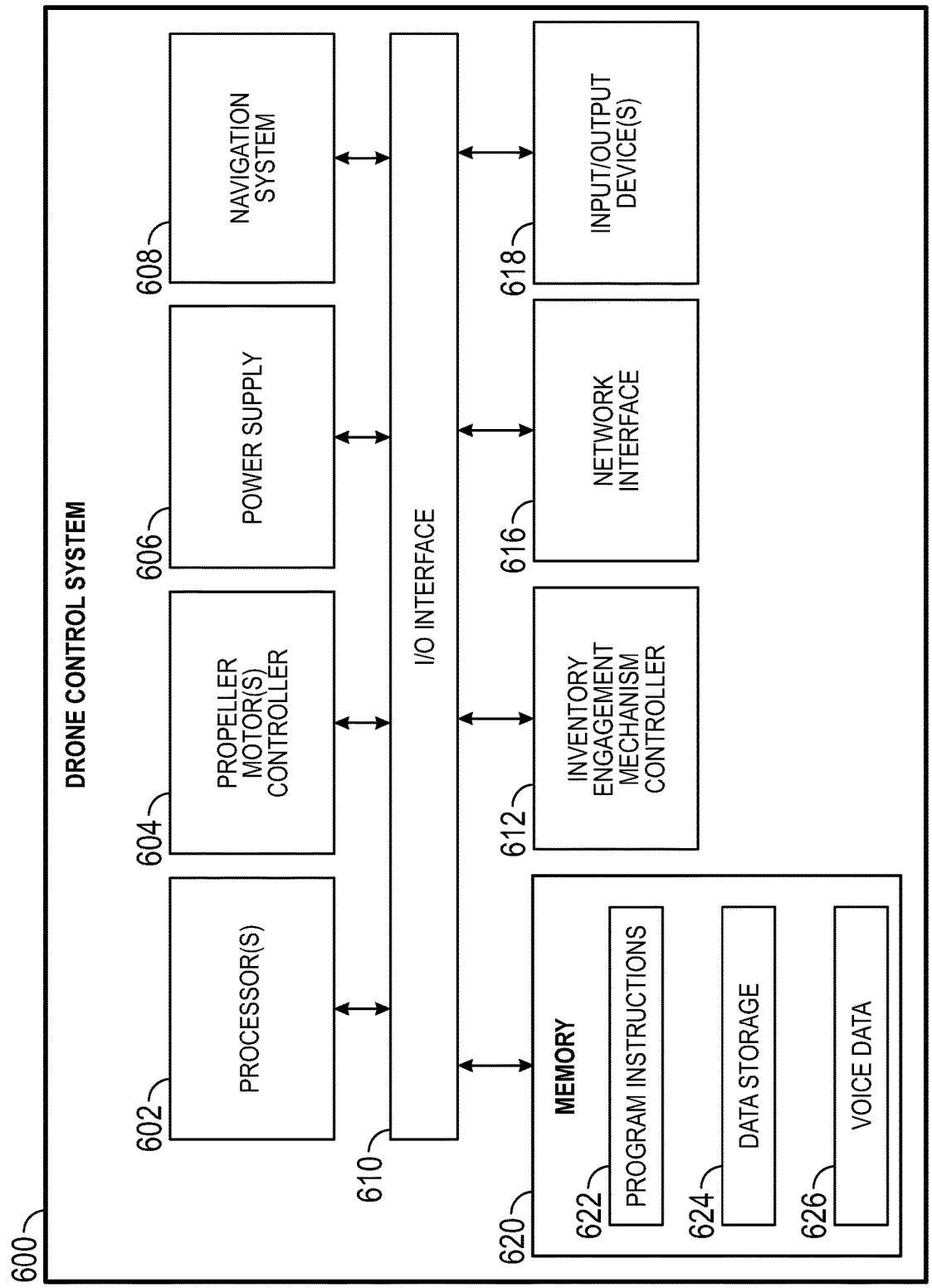
FIG. 8 is a block diagram illustrating an example drone control system, according to one embodiment.

FIG. 8 is a block diagram illustrating an example control system 600 of a drone previously described with reference to various example embodiments. In various examples, the block diagram may be illustrative of one or more aspects of the control system 600 that may be used to implement the various apparatuses, systems and methods discussed above. In the illustrated implementation, the control system 600 includes one or more processors 602, coupled to a non-transitory computer readable storage medium in the form of a memory 620 via an input/output (I/O) interface 610. The control system 600 may also include a propeller motor controller 604, such as an electronic speed control (ESC), a power supply 606 and/or a navigation system 608. The control system 600 further includes an inventory engagement mechanism controller 612, a network interface 616, and one or more input/output devices 618.

In various implementations, the control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, navigation paths and/or data items accessible by the processor(s) 602. In various implementations, the nontransitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624 and voice data 626, respectively. In other implementations, program instructions, data and/or voice data may be received, sent or stored upon different types of computer-accessible media, such as non-transitory media, or on similar media separate from the non-transitory computer readable storage medium 620 or the control system 600. Generally speaking, a non-transitory, computer readable storage medium may include storage media or memory media such as magnetic or optical media, e.g., disk or CD/DVDROM, coupled to the control system 600 via the I/O interface 610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 610 or other peripheral interfaces, such as input/output devices 618. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propeller motor(s) controller 604 communicates with the navigation system 608 and adjusts the power of each propeller motor to guide the drone along a determined navigation path to a delivery location. The navigation system 608 may include a GPS or other similar system than can be used to navigate the drone to and/or from a delivery location. The inventory engagement mechanism controller 612 communicates with the motor(s) (e.g., a servo motor) used to engage and/or disengage inventory. For example, when the drone is positioned over a level surface at a delivery location, the inventory engagement mechanism controller 612 may provide an instruction to a motor that controls the inventory engagement mechanism to release the inventory.

The network interface 616 may be configured to allow data to be exchanged between the control system 600, other devices attached to a network, such as other computer systems, and/or with drone control systems of other drones. For example, the network interface 616 may enable wireless communication between numerous drones that are transporting inventory to various delivery destinations. In various implementations, the network interface 616 may support communication via wireless general data networks, such as a Wi-Fi network. For example, the network interface 616 may support communication via telecommunications networks such as cellular communication networks, satellite networks, and the like.

Input/output devices 618 may, in some implementations, include one or more displays, image capture devices, thermal sensors, infrared sensors, time of flight sensors, accelerometers, pressure sensors, weather sensors, etc. Multiple input/output devices 618 may be present and controlled by the control system 600. One or more of these sensors may be utilized to assist in the landing as well as avoid obstacles during delivery and/or engagement of inventory. For example, utilizing a location signal from the GPS receiver and one or more IR sensors, the drone may safely land on a location designated by the user. The IR sensors may be used to provide real-time data to assist the drone in avoiding moving/movable obstacles.

As shown in FIG. 8, the memory 620 may include program instructions 622 which may be configured to implement the example processes and/or sub-processes described above. The data storage 624 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Software Architecture

Figure 9:
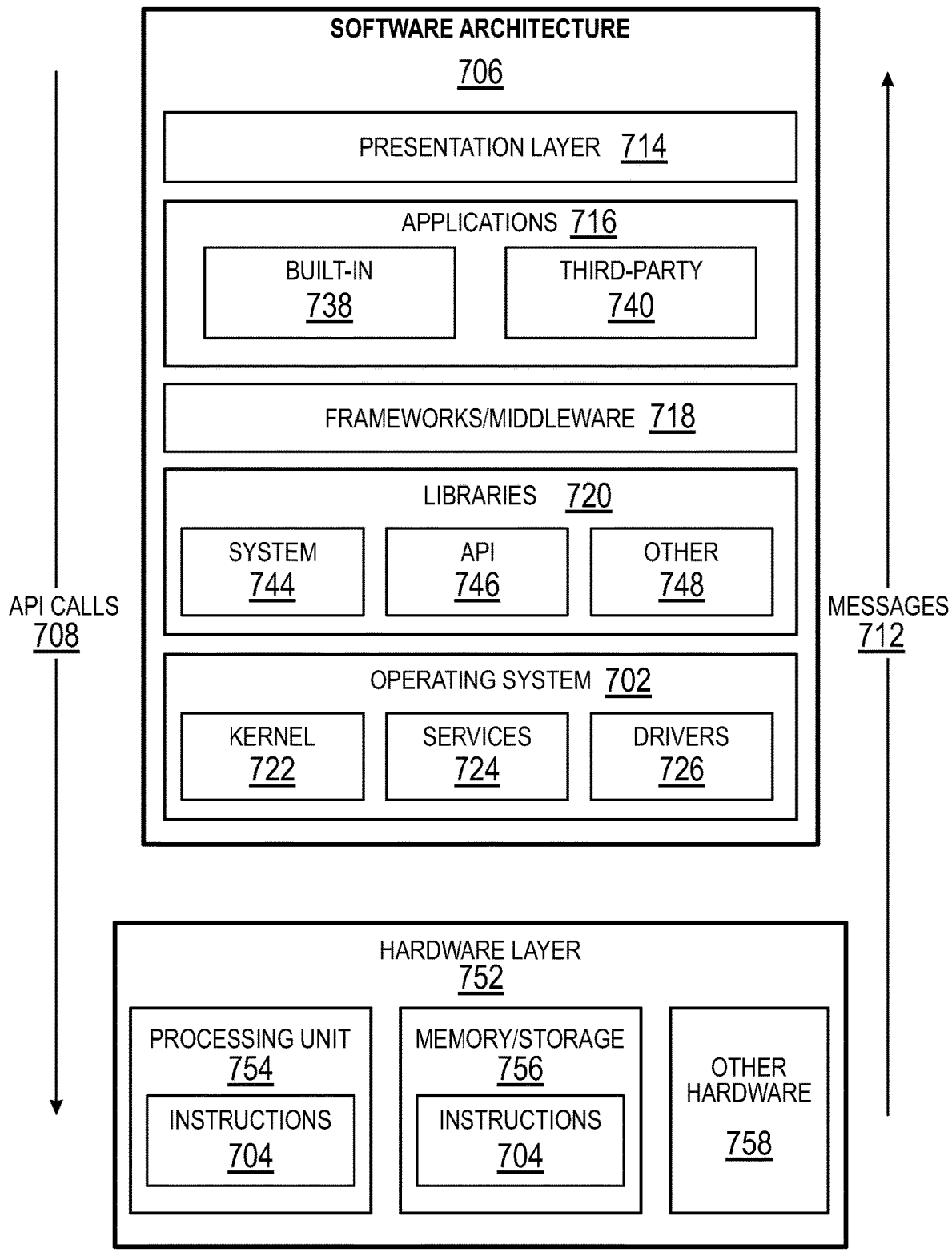
FIG. 9 is a block diagram illustrating an example software architecture, which may be used in conjunction with various hardware architectures herein described, according to one embodiment.

FIG. 9 is a block diagram illustrating an example software architecture 706, which may be used in conjunction with various hardware architectures herein described. FIG. 9 is a non-limiting example of a software architecture and it will be appreciated that many other architectures may be implemented to facilitate the functionality described herein. The software architecture 706 may execute on hardware such as machine 800 of FIG. 10 that includes, among other things, processors 810, memory 830, and I/O components 850. A representative hardware layer 752 is illustrated and can represent, for example, the machine 800 of FIG. 10. The representative hardware layer 752 includes a processing unit 754 having associated executable instructions 704. Executable instructions 704 represent the executable instructions of the software architecture 706, including implementation of the methods, components and so forth described herein. The hardware layer 752 also includes memory and/or storage modules memory/storage 756, which also have executable instructions 704. The hardware layer 752 may also comprise other hardware 758.

In the example architecture of FIG. 9, the software architecture 706 may be conceptualized as a stack of layers where each layer provides particular functionality. For example, the software architecture 706 may include layers such as an operating system 702, libraries 720, applications 716 and a presentation layer 714. Operationally, the applications 716 and/or other components within the layers may invoke application programming interface (API) API calls 708 through the software stack and receive a response as in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724 and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724 and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724 and/or drivers 726), libraries 720, and frameworks/middleware 718 to create user interfaces to interact with users of the system. Alternatively, or additionally, in some systems interactions with a user may occur through a presentation layer, such as presentation layer 714. In these systems, the application/component "logic" can be separated from the aspects of the application/component that interact with a user.

Figure 10:
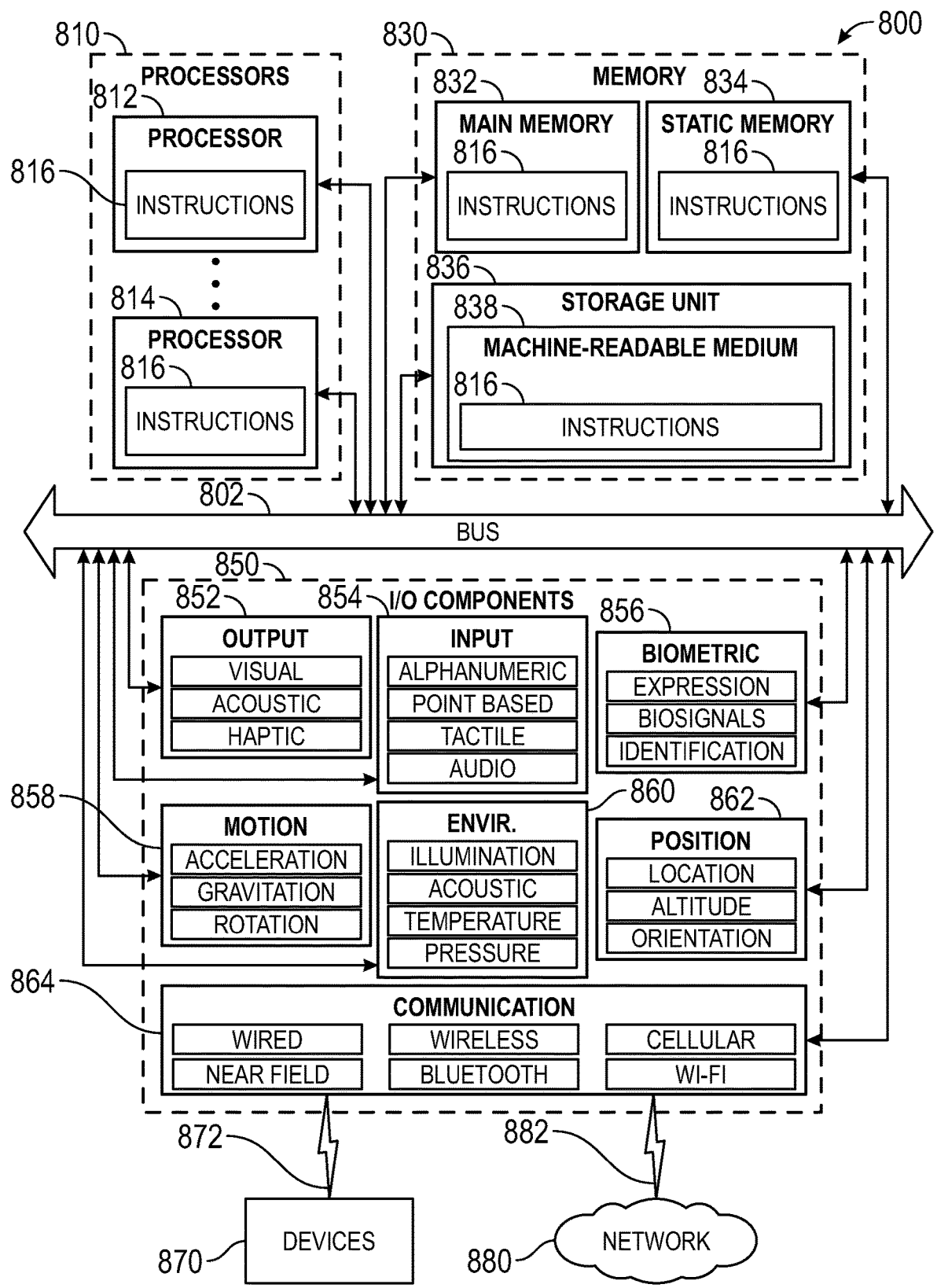
FIG. 10 illustrates components of a machine able to read instructions from a machine-readable medium and perform any one or more of the methodologies discussed herein, according to one embodiment.

FIG. 10 is a block diagram illustrating components of a machine 800, according to some example embodiments, able to read instructions from a machine-readable medium 838 (e.g., a machine-readable storage medium) and perform any one or more of the methodologies discussed herein. Specifically, FIG. 10 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory memory/storage 830, and I/O components 850, which may be configured to communicate with each other such as via a bus 802. The memory/storage 830 may include a memory, such as a main memory 832 and static memory 834, or other memory storage, and a storage unit 836, both accessible to the processors 810 such as via the bus 802. The storage unit 836 and main memory 832 and static memory 834 store the instructions 816 embodying any one or more of the methodologies or functions described herein. The instructions 816 may also reside, completely or partially, within the main memory 832 and static memory 834, within the storage unit 836, within at least one of the processors 810 (e.g., within the processor's cache memory), or any suitable combination thereof, during execution thereof by the machine 800. Accordingly, the main memory 832 and static memory 834, the storage unit 836, and the memory of processors 810 are examples of machine-readable media.

The I/O components 850 may include a wide variety of components to receive input, provide output, produce output, transmit information, exchange information, capture measurements, and so on. The specific I/O) components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 10. The I/O components 850 are grouped according to functionality merely for simplifying the following discussion and the grouping is in no way limiting. In various example embodiments, the I/O components 850 may include output components 852 and output components 852. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The output components 852 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental environment components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environment components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a networ being the k (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The above description includes apparatuses, systems, methods, techniques, instruction sequences, and computing machine program products illustrative of embodiments of the disclosure. For the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

EXAMPLE

Drones such as those disclosed herein can be operated by a human operator or can fly autonomously as directed by onboard computers. For example, drones can fly, hover or navigate without input from a pilot, i.e., autonomously. It is also contemplated that drones disclosed herein are controlled by a dedicated remote control device, which commonly is wireless. For example, drones are usually equipped with a receiver that receives instructions for movement or other action from a transmitter. The transmitter is operated by a user, and the transmitter and the receiver often communicate using radio frequencies. Communication between the drone and the transmitter or the remote control can be achieved by variety of technologies. Wi-fi provides the ability to transmit heavy amounts of data to and from the drone within a specific control radius compared to, for example, Bluetooth communication. Wi-fi and Bluetooth connections allow a remote control device to run on a tablet or smartphone, for example. There are mobile applications for viewing drone position using GPS, drone flight paths or other drone flight statistics such as speed, battery life, and fly time.

According to one aspect of the disclosure, a drone control technique is provided in which one or more attributes of a spatial vector to be followed by the drone is automatically determined based at least in part on one or more of the angle the plurality of propellers are pitched forward relative to the flight path, an angle of attack of one or more portions of the plurality of propeller guards at a leading edge of the drone or a center of pressure of one or more portions of the plurality of propeller guards. In some embodiments, one or more of the direction, distance and speed attributes of the drone's flight path is determined based on a direction and a distance by which the drone moves relative to a reference object (e.g., an operator location, a predefined GPS location, a second drone, etc.). Thus, the direction, size, and/or speed of the flight path is variable with variation in the spatial vector. In some embodiments, various combinations of the direction, distance and speed can be determined based on the spatial vector. The reference object is an object relative to which the drone's position can be determined in a three dimensional space.

Such automated determination of the spatial vector based upon various attributes such as the flight path, the angle the plurality of propellers are pitched forward relative to the flight path, an angle of attack of one or more portions of the plurality of propeller guards at a leading edge of the drone or a center of pressure of one or more portions of the plurality of propeller guards. In some embodiments, the vector-based drone control technique enables or facilitates control of the drone in the absence of any physical controller, thereby reducing cost and improving convenience.

In some embodiments, the flight path of the drone for at least some purposes is wholly determined by a position of the drone relative to a focal point or reference object, being an object that serves as a point of reference for positioning of the drone in three-dimensional space. In one embodiment, a vector that expresses the direction and the distance between the drone and the reference object is computed. Such a spatial or geometric vector is not to be confused with velocity vectors or acceleration vectors that may in some instances be determined by use of motion sensors and/or accelerometers forming part of the drone. A shape of the flight path (i.e. positioning of the drone in three-dimensional space) will be dependent on the spatial vector. However, the spatial vector can vary and can be dependent upon various factors as previously discussed above in reference to FIG. 6 including the angle the plurality of propellers are pitched forward relative to the flight path, an angle of attack of one or more portions of the plurality of propeller guards at a leading edge of the drone or a center of pressure of one or more portions of the plurality of propeller guards and operational criteria (desired operational input such as speed, the horizontal, the vertical, take-off location, landing location, the operator location, certain geographic feature location, sensed criteria such as wind speed and direction, altitude, sensed landscape features, payload etc.)

Upon determining/computing the spatial vector, the drone can execute a flight path such as a forward flight path, landing flight path, take-off flight path or rearward flight path according to the computed spatial vector. In another embodiment, the drone may fly in a forward direction towards the reference object and then towards another object, according to the computed spatial vector. In yet another embodiment, the drone may fly around the reference object according to the computed spatial vector. In yet another embodiment, the drone may fly away from the reference object but instead of utilizing a straight line (as illustrated in FIGS. 2 and 3), the drone may fly in a curved line, arc or another shaped forward flight path according to the computed spatial vector.

Claim Related Examples

According to one Example, a flight-capable drone that can optionally comprise: a body; a plurality of propellers each coupled to and having a fixed rotational axis relative to the body, the plurality of propellers operably configured to enable flight along a flight path, wherein during the flight path the plurality of propellers are pitched forward at an angle relative to the flight path; and a plurality of propeller guards fixedly coupled to the body and having a least a part-annular extent, each one of the plurality of propeller guards positioned radially adjacent a tip of a corresponding one of the plurality of propellers to protect the corresponding propeller from contact, wherein the plurality of propeller guards are configured as an airfoil along at least a portion of the part-annular extent thereof to generate lift during flight along the flight path.

Example 2 is the drone of Example 1, optionally where the plurality of propeller guards have a full annular shape and are continuous propeller guards.

Example 3 is the drone of any one of Examples 1 or 2, optionally where the airfoil defined by each of the plurality of propeller guards has a first portion with a first upper chamber that interfaces with the tip of the corresponding one of the plurality of propellers and a second opposing portion with a second upper chamber that is spaced across a chord line of the second portion from the tip of the corresponding one of the plurality of propellers.

Example 4 is the drone of Example 3, wherein optionally the airfoil defined by the plurality of propeller guards is configured such that, during the flight path, the first portion has a first center of pressure that is positioned forward of the tip of the corresponding one of the plurality of propellers and the second portion has a second center of pressure that is positioned rearward of the tip of the corresponding one of the plurality of propellers.

Example 5 is the drone of Example 4, wherein optionally the airfoil defined by the plurality of propeller guards is configured such that the first portion and the second portion have a same first angle between a chord line thereof and the flight path but different second angles between the chord line thereof and the corresponding one of the plurality of propellers.

Example 6 is the drone of Example 4, wherein optionally the airfoil defined by the plurality of propeller guards is configured such that the first portion and the second portion have a same first angle between a chord line thereof and the flight path but different second angles between the chord line thereof and the corresponding one of the plurality of propellers.

Example 7 is the drone of Example 6, wherein optionally the airfoil defined by the plurality of propeller guards is configured such that the leading edge of the first portion is positioned forward of the leading edge of the second portion during the flight path.

Example 8 is the drone of Example 6, wherein optionally the airfoil defined by the plurality of propeller guards is configured such that the first center of pressure of the first portion is positioned forward of the leading edge of the second portion during the flight path.

Example 9 is the drone of any one or any combination of Examples 1-8, wherein optionally the flight path comprises a forward flight path, and wherein the plurality of propellers are pitched forward at the angle relative to the forward flight path of between 60 degrees and 90 degrees.

Example 10 is the drone of any one or combination of Examples 1 or 9, wherein optionally the plurality of propeller guards have less than a full annular shape and comprise partial propeller guards.

Example 11 is the drone of any one of Examples 1-10, wherein optionally a leading edge the plurality of propeller guards has a radius.

Example 12 is the drone of any one or combination of Examples 1-11, wherein optionally the plurality of propeller guards are non-symmetrically shaped along a propeller interfacing surface such that only a portion of the propeller interfacing surface is contoured to produce the lift.

Example 13 is the drone of any one of Examples 1-12, further optionally comprising an on-board computer having memory and at least one processor, the memory storing instructions which when executed by the at least one processor cause operations comprising: computing a spatial vector of the flight path, the spatial vector being between the flight-capable drone and a reference object, the spatial vector defining a direction and a distance by which the drone moves relative to the reference object; determining one or more of an angle the plurality of propellers are pitched forward relative to the forward flight path, an angle of attack of one or more portions of the plurality of propeller guards at a leading edge of the drone or a center of pressure of one or more portions of the plurality of propeller guards based on the computed spatial vector; and controlling movement of the drone according to the computed spatial vector and the determined angle.

Example 14 is a flight-capable drone that can optionally comprise: a body; a plurality of propellers each coupled to and having a fixed rotational axis relative to the body, the plurality of propellers operably configured to propel the body into flight including along a forward flight path, wherein during the forward flight path the plurality of propellers are pitched forward at an angle relative to the forward flight path; and a plurality of propeller guards having a generally annular shape and are fixedly coupled to the body, each one of the plurality of propeller guards positioned adjacent a tip of a corresponding one of the plurality of propellers to protect the corresponding one of the plurality of propellers from contact, wherein the propeller guards are configured with a first portion with a first upper chamber that interfaces with the tip of the corresponding one of the plurality of propellers and a second opposing portion with a second upper chamber that is spaced across the chord line from the tip of the corresponding one of the plurality of propellers.

Example 15 is the drone of Example 14, wherein optionally the plurality of propeller guards are configured such that, during the forward flight path, the first portion has a first center of pressure that is positioned forward of the tip of the corresponding one of the plurality of propellers and the second portion has a second center of pressure that is positioned rearward of the tip of the corresponding one of the plurality of propellers.

Example 16 is the drone of any one or combination of Examples 14-15, wherein optionally the plurality of propeller guards are configured such that the first portion and the second portion have a same first angle between a chord line thereof and the forward flight path but different second angles between the chord line thereof and the corresponding one of the plurality of propellers.

Example 17 is the drone of any one or combination of Examples 14-16, wherein optionally the plurality of propeller guards are configured such that the first portion and the second portion have a leading edge with a same radius.

Example 18 is the drone of Example 17, wherein optionally the plurality of propeller guards are configured such that the leading edge of the first portion is positioned forward of the leading edge of the second portion during the forward flight path.

Example 19 is the drone of Example 17, wherein optionally the plurality of propeller guards are configured such that the first center of pressure of the first portion is positioned forward of the leading edge of the second portion during the forward flight path.

Example 20 is the drone of any one or combination of Examples 14-18, further optionally comprising an on-board computer having memory and at least one processor, the memory storing instructions which when executed by the at least one processor cause operations comprising: computing a spatial vector of the forward flight path, the spatial vector being between the flight-capable drone and a reference object, the spatial vector defining a direction and a distance by which the drone moves relative to the reference object; determining the angle the plurality of propellers are pitched forward relative to the forward flight path based on the computed spatial vector; and controlling movement of the drone according to the computed spatial vector and the determined angle

What is claimed is:

1. A flight-capable drone comprising: a body; a plurality of propellers each coupled to and having a fixed rotational axis relative to the body, the plurality of propellers operably configured to enable flight along a flight path, wherein during the flight path the plurality of propellers are pitched forward at an angle relative to the flight path; and a plurality of propeller guards fixedly coupled to the body and having a least a part-annular extent, each one of the plurality of propeller guards positioned radially adjacent a tip of a corresponding one of the plurality of propellers to protect the corresponding propeller from contact, wherein the plurality of propeller guards are configured as an airfoil along at least a portion of the part-annular extent thereof to generate lift during flight along the flight path; wherein the airfoil defined by each of the plurality of propeller guards has a first portion with a first upper chamber that interfaces with the tip of the corresponding one of the plurality of propellers and a second opposing portion with a second upper chamber that is spaced across a chord line of the second portion from the tip of the corresponding one of the plurality of propellers: and wherein the airfoil defined by the plurality of propeller guards is configured such that, during the flight path, the first portion has a first center of pressure that is positioned forward of the tip of the corresponding one of the plurality of propellers and the second portion has a second center of pressure that is positioned rearward of the tip of the corresponding one of the plurality of propellers, wherein the upper chamber differs in shape from the lower chamber.

2. The drone of claim 1, wherein the plurality of propeller guards have a full annular shape and are continuous propeller guards.

3. The drone of claim 1, wherein the airfoil defined by the plurality of propeller guards is configured such that the first portion and the second portion have a same first angle between a chord line thereof and the flight path but different second angles between the chord line thereof and the corresponding one of the plurality of propellers.

4. The drone of claim 1, wherein the airfoil defined by the plurality of propeller guards is configured such that the first portion and the second portion each have a substantially identical shape at a leading edge so as to have a same radius.

5. The drone of claim 4, wherein the airfoil defined by the plurality of propeller guards is configured such that the leading edge of the first portion is positioned forward of the leading edge of the second portion during the flight path.

6. The drone of claim 4, wherein the airfoil defined by the plurality of propeller guards is configured such that the first center of pressure of the first portion is positioned forward of the leading edge of the second portion during the flight path.

7. The drone of claim 1, wherein the flight path comprises a forward flight path, and wherein the plurality of propellers are pitched forward at the angle relative to the forward flight path of between 60 degrees and 90 degrees.

8. The drone of claim 1, wherein the plurality of propeller guards have less than a full annular shape and comprise partial propeller guards.

9. The drone of claim 1, wherein a leading edge the plurality of propeller guards has a radius.

10. The drone of claim 1, wherein the plurality of propeller guards are non-symmetrically shaped along a propeller interfacing surface such that only a portion of the propeller interfacing surface is contoured to produce the lift.

11. The drone of claim 1, further comprising an on-board computer having memory and at least one processor, the memory storing instructions which when executed by the at least one processor cause operations comprising:
computing a spatial vector of the flight path, the spatial vector being between the flight-capable drone and a reference object, the spatial vector defining a direction and a distance by which the drone moves relative to the reference object;
determining one or more of an angle the plurality of propellers are pitched forward relative to the forward flight path, an angle of attack of one or more portions of the plurality of propeller guards at a leading edge of the drone or a center of pressure of one or more portions of the plurality of propeller guards based on the computed spatial vector; and
controlling movement of the drone according to the computed spatial vector and the determined angle.

12. A flight-capable drone comprising: a body; a plurality of propellers each coupled to and having a fixed rotational axis relative to the body, the plurality of propellers operably configured to propel the body into flight including along a forward flight path, wherein during the forward flight path the plurality of propellers are pitched forward at an angle relative to the forward flight path; and a plurality of propeller guards having a generally annular shape and are fixedly coupled to the body, each one of the plurality of propeller guards positioned adjacent a tip of a corresponding one of the plurality of propellers to protect the corresponding one of the plurality of propellers from contact, wherein the propeller guards are configured with a first portion with a first upper chamber that interfaces with the tip of the corresponding one of the plurality of propellers and a second opposing portion with a second upper chamber that is spaced across a chord line from the tip of the corresponding one of the plurality of propellers; wherein the plurality of propeller guards are configured such that the first portion and the second portion have a same first angle between a chord line thereof and the forward flight path but different second angles between the chord line thereof and the corresponding one of the plurality of propellers, wherein the upper chamber differs in shape from the lower chamber.

13. The drone of claim 12, wherein the plurality of propeller guards are configured such that, during the forward flight path, the first portion has a first center of pressure that is positioned forward of the tip of the corresponding one of the plurality of propellers and the second portion has a second center of pressure that is positioned rearward of the tip of the corresponding one of the plurality of propellers.

14. The drone of claim 13, wherein the plurality of propeller guards are configured such that the first portion and the second portion have a leading edge with a same radius.

15. The drone of claim 14, wherein the plurality of propeller guards are configured such that the leading edge of the first portion is positioned forward of the leading edge of the second portion during the forward flight path.

16. The drone of claim 14, wherein the plurality of propeller guards are configured such that the first center of pressure of the first portion is positioned forward of the leading edge of the second portion during the forward flight path.

17. The drone of claim 12, further comprising an on-board computer having memory and at least one processor, the memory storing instructions which when executed by the at least one processor cause operations comprising:
computing a spatial vector of the forward flight path, the spatial vector being between the flight-capable drone and a reference object, the spatial vector defining a direction and a distance by which the drone moves relative to the reference object;
determining the angle the plurality of propellers are pitched forward relative to the forward flight path based on the computed spatial vector; and
controlling movement of the drone according to the computed spatial vector and the determined angle.

* * * * *